(12) United States Patent
Rohner et al.

(10) Patent No.: US 7,199,578 B2
(45) Date of Patent: Apr. 3, 2007

(54) MEASUREMENT DEVICE INCLUDING A HALL SENSOR DISPOSED IN A MAGNETIC TUBE

(75) Inventors: Gerhard Rohner, Hemsbach (DE); Reinhard Tinz, Grob-Bieberau (DE); Volker Daume, Hirschhorn (DE); Jorg Bittner, Weinheim-Hohensachsen (DE); Uwe Meinig, Weinheim (DE); Manfred Busch, Frankfurt (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 10/511,816

(22) PCT Filed: Apr. 22, 2003

(86) PCT No.: PCT/EP03/04161

§ 371 (c)(1),
(2), (4) Date: Jun. 1, 2005

(87) PCT Pub. No.: WO03/093769

PCT Pub. Date: Nov. 13, 2003

(65) Prior Publication Data

US 2005/0248337 A1 Nov. 10, 2005

(30) Foreign Application Priority Data

Apr. 30, 2002 (DE) ................................ 102 19 473

(51) Int. Cl.
*G01B 7/14* (2006.01)

(52) U.S. Cl. ............................. 324/207.2; 324/207.24
(58) Field of Classification Search ............. 324/207.2, 324/207.24, 207.21, 207.25, 220–221; 338/32 H, 338/32 R
See application file for complete search history.

(56) References Cited

U.S. PATENT DOCUMENTS 5,365,791 A    11/1994    Padula et al.
5,493,216 A *   2/1996    Asa ........................ 324/207.2
6,657,351 B2 * 12/2003   Chen et al. .................. 310/171
6,823,725 B2 * 11/2004   Lohberg ...................... 73/116

FOREIGN PATENT DOCUMENTS

WO    WO 93 22778 A    11/1993
WO    WO 9322778    * 11/1993

* cited by examiner

*Primary Examiner*—Jay M. Patidar
(74) *Attorney, Agent, or Firm*—Harness, Dickey & Pierce, P.L.C.

(57) ABSTRACT

A measuring device including a Hall sensor arranged in a centrally and axially movable manner in a magnetic tube. Each half of the magnetic tube includes a north and south pole that are diametrically opposed, wherein the north pole on the first half of the tube is also diametrically opposed to the north pole on the second half of the tube, and the south pole formed on the first half of the tube is also diametrically opposed to the south pole on the second half of the tube.

3 Claims, 5 Drawing Sheets

MEASUREMENT DEVICE INCLUDING A HALL SENSOR DISPOSED IN A MAGNETIC TUBE

CROSS-REFERENCE TO RELATED APPLICATIONS

This application is a National Stage of International Application No. PCT/EP03/04161, filed Apr. 22, 2003. This application claims the benefit of German Patent Application 102 19 473.4, filed Apr. 30, 2002. The disclosure of the above application is incorporated herein by reference.

FIELD OF THE INVENTION

The present invention relates to a measuring device with a Hall sensor, particularly for displacement measurements, and to a method for fabricating the measuring device.

BACKGROUND OF THE INVENTION

It is known to use Hall sensors for measuring various parameters. Such sensors are used, for example, for measuring magnetic fields, wattage in high-voltage power lines, for contactless control and regulation of motion, and many other uses. The measurement of motion, however, is possible only for very short motion paths of only a few millimeters.

SUMMARY OF THE INVENTION

The object of the invention is to provide a measuring device with a Hall sensor to be used, in particular, for a displacement measurement whereby longer paths than before can be measured with accuracy.

Another object is to provide a method for fabricating the measuring device.

According to the invention, in a measuring device with a Hall sensor, particularly for a displacement measurement, this objective is reached by disposing the Hall sensor in a magnetic tube centrally so that it can be moved axially. Each half of the magnetic tube is cross-magnetized with opposite polarity. Tests have shown that such a measuring device provides very accurate measurements over a considerably longer path length than previous measuring devices with Hall sensors. For example, with a magnetic tube length of 20 mm, an approximately linear range useful for the measurement having a length of about 14 mm was achieved.

In designing the measuring device, it is important that the Hall sensor be kept in an axially displaceable support, or that it be displaced axially in a support in a manner such that rotary motions of the Hall sensor relative to the magnetic tube are not possible.

The novel Hall sensor is of simple configuration and is suitable for measurements over long paths. It is not subject to disturbances and is virtually linear. Moreover, it does not require external electronic evaluation circuits. The Hall sensor is moved centrally in the magnetic tube, wherein each half of the tube is cross-magnetized with opposite polarity. The flux density is highest at a distance of a few millimeters from the poles. In the center of the magnetic tube, the flux density is nil and changes its direction.

Compensation of the temperature dependence can be achieved in a simple manner by suitably pairing the Hall sensor with the material of which the magnet is made so that the temperature variations of the two materials compensate each other.

The fabrication of Hall sensors is in itself known. Different methods can be used to produce the novel magnetic tube for the measuring device. An advantageous method consists of cross-magnetizing a tube made of a magnetizable material in a diametrically opposite manner so that, in the upper part of the tube, one half of the tube is magnetized as the magnetic north pole and the other half of the tube is magnetized as the magnetic south pole. In the bottom part of the tube, the procedure is reversed. That is one half of the tube is magnetized as the magnetic south pole and the other half is magnetized as the magnetic north pole.

A very simple method for fabricating the magnetic tube for the measuring device consists of through-magnetizing a tube of magnetizable material perpendicularly to its axis so that one half of the tube is magnetized as the magnetic north pole and the other half of the tube as the magnetic south pole. The tube is then severed across its axis, and one of the parts of the tube is turned 180° relative to the other part of the tube. In this manner are obtained the diametrically opposite north and south poles of the magnetic tube for the measuring device.

BRIEF DESCRIPTION OF THE DRAWINGS

The invention will now be explained in greater detail with the aid of the practical examples represented in the drawings, in which.

DETAILED DESCRIPTION OF THE PREFERRED EMBODIMENTS

Figure 1:
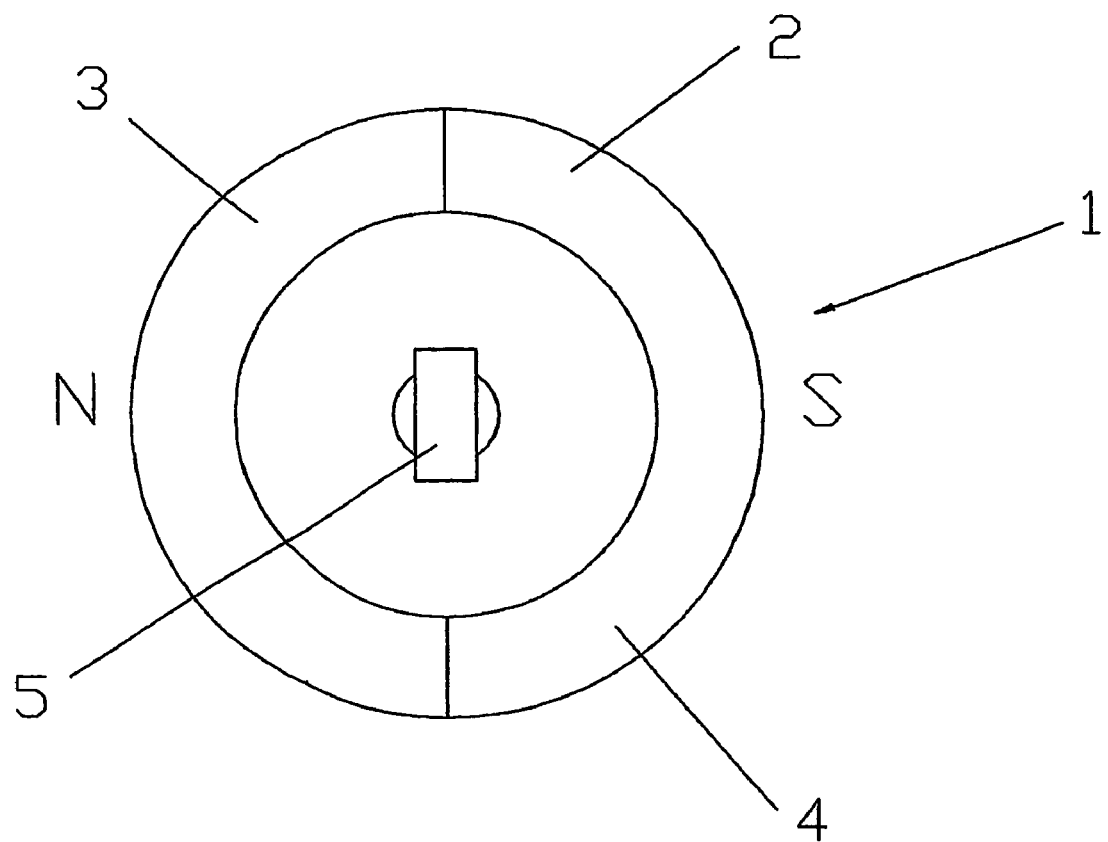
FIG. 1 and FIG. 2 show a top view and a longitudinal sectional view of the configuration principle of the measuring device.

FIG. 1 shows a configuration of a measuring device 1 according to the present invention. The measuring device 1 consists of a magnetic tube 2 with a north pole side 3 and a south pole side 4, as well as a Hall sensor 5 disposed centrally in the magnetic tube 2.

Figure 2:
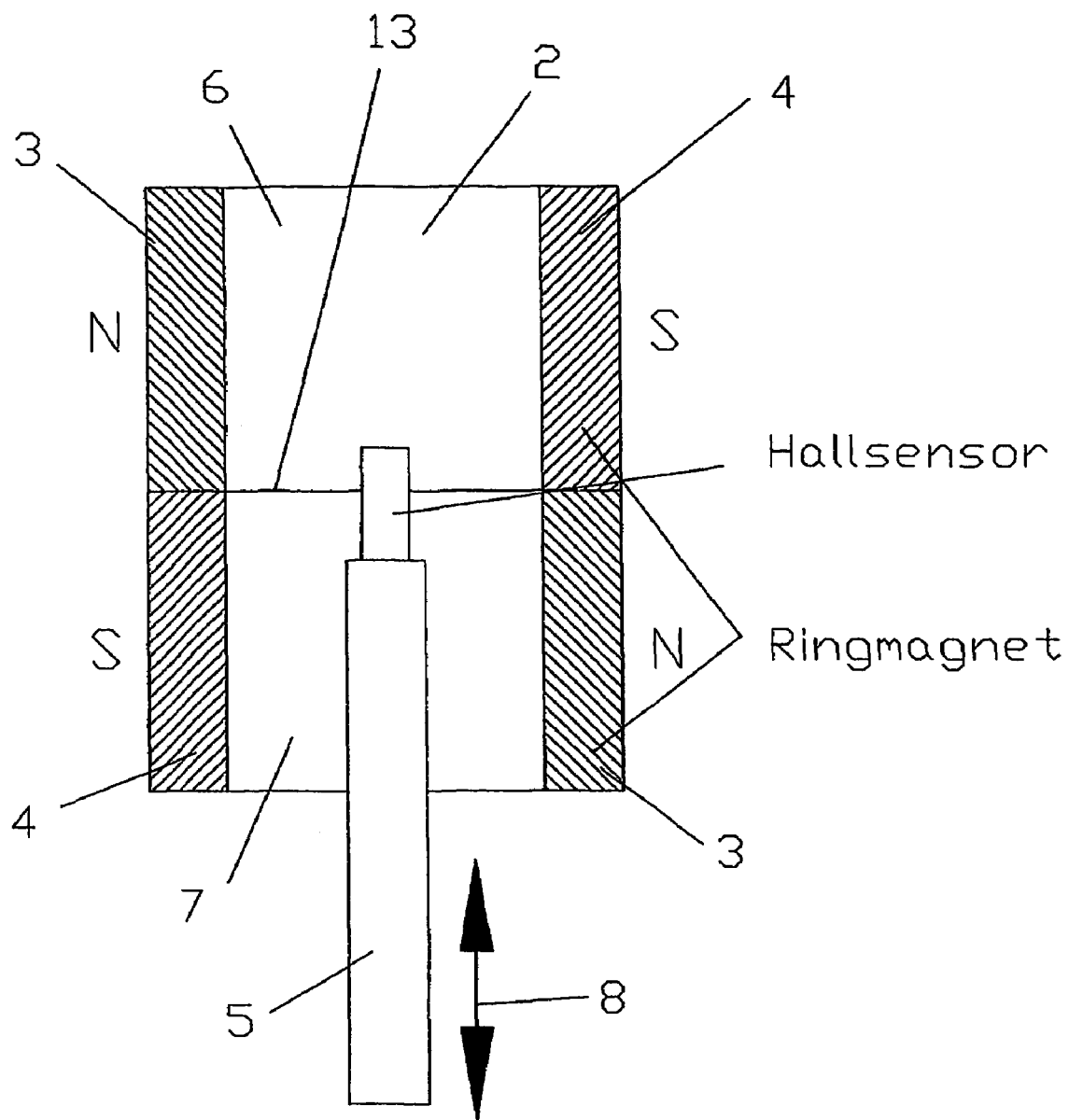

As can be seen from FIG. 2, the magnetic tube 2 is configured so that, as seen in the longitudinal direction, it is divided into two halves. One half 6 is configured with the north pole on the left side and the south pole 4 on the right side, and the other half 7 of magnetic tube 2 is configured in the reverse manner. That is, the north pole 3 is located on the right side and south pole 4 on the left side of the magnetic tube 2. As indicated by double arrow 8, in the magnetic tube 2, the Hall sensor 5 can be moved back and forth in the axial direction. For this purpose, there is provided a support, not shown in detail, which permits axial movement of the Hall sensor 5, but prevents the Hall sensor 5 from rotating relative to the magnetic tube 2.

Figure 3:
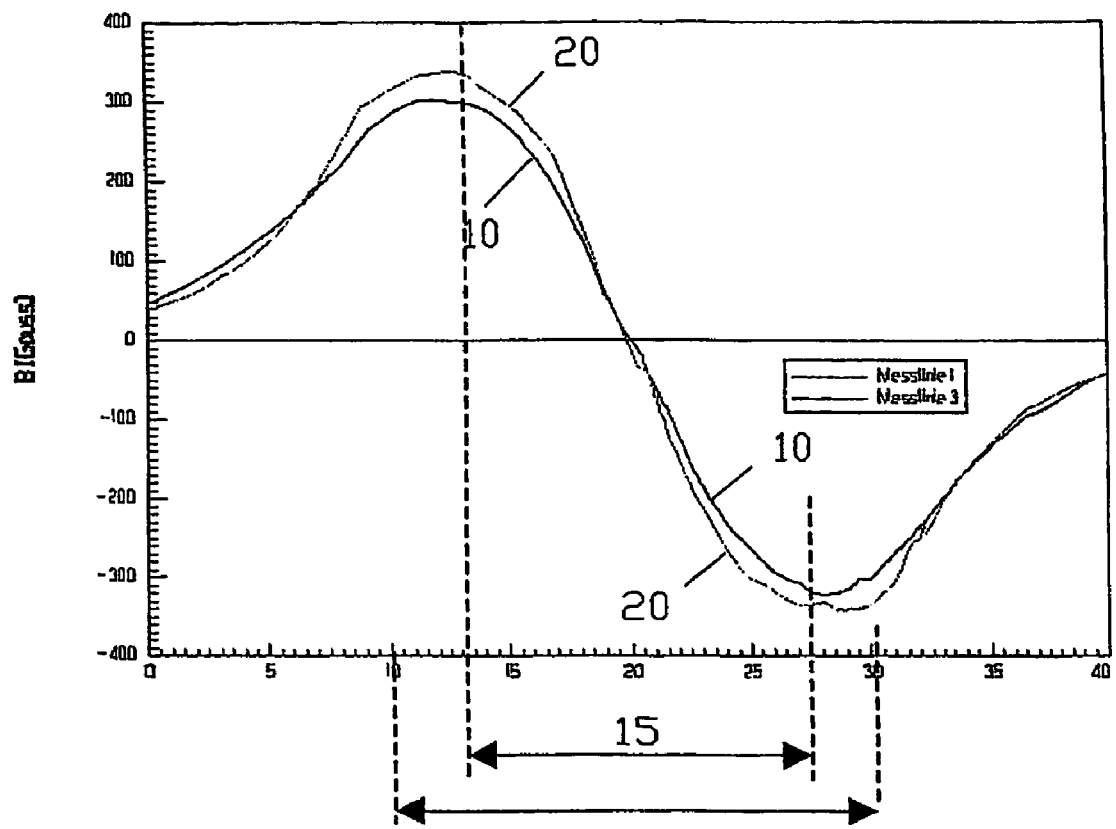
FIG. 3 shows a diagram of a measuring signal recorded in gauss against the measuring path.

FIG. 3 shows the diagram of a performed test in gauss against the path length. For a measuring device with a magnetic tube of 20-mm length, a usable, nearly linear range of about 14 mm was obtained. Measuring line 10 was obtained by use of a Hall sensor 5 disposed in the middle of the magnetic tube 2, whereas measuring line 20 was obtained with a Hall sensor 5 disposed in the vicinity of the inner wall of the magnetic tube 2. The outer diameter of the magnetic tube was 14 mm and the inner diameter of the magnetic tube was 8 mm. For both measuring lines 10 and 20, a range 15 is approximately linear and may be viewed as useful.

Figure 4:
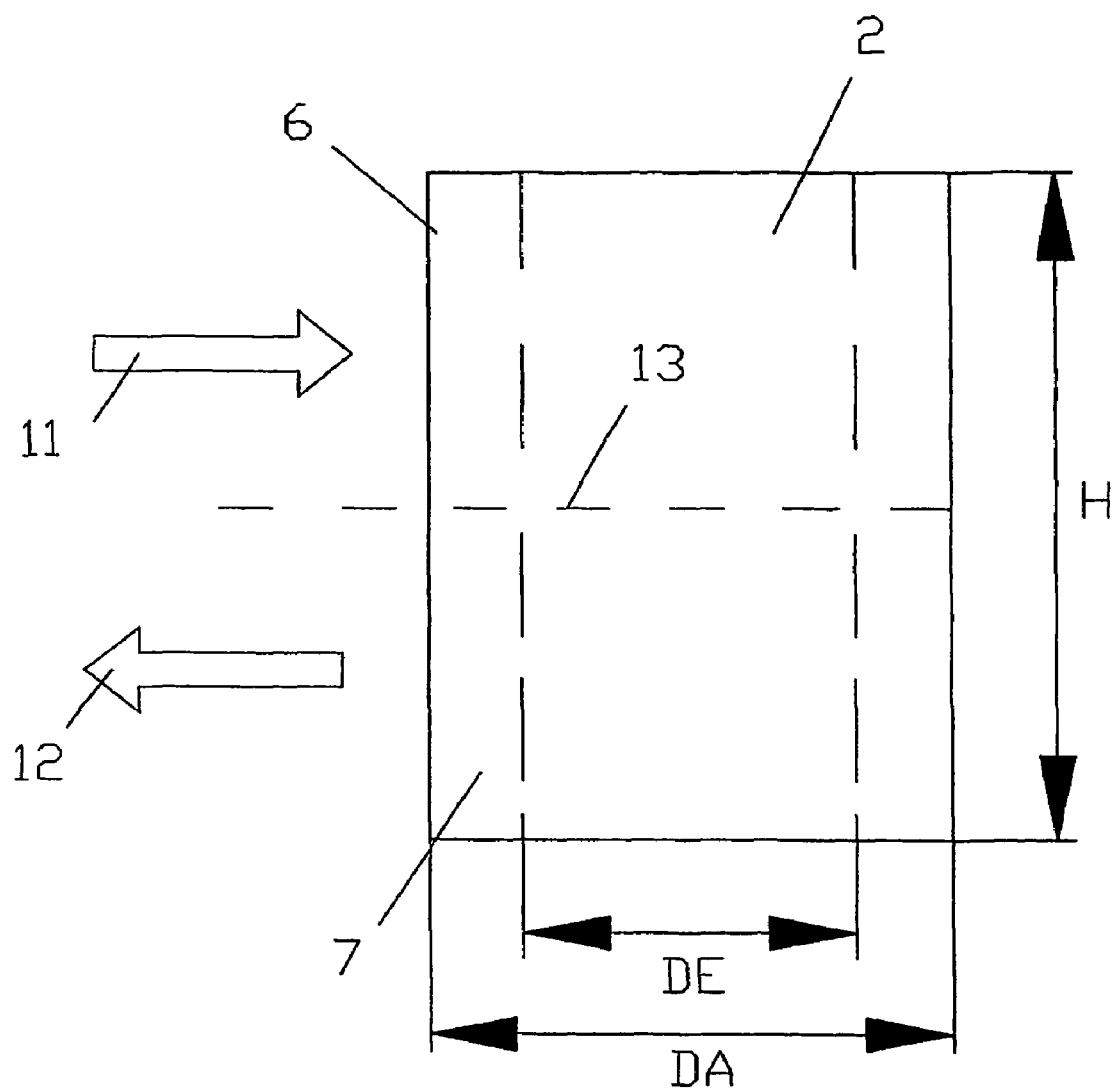
FIG. 4 shows the procedure for diametrically opposite through-magnetization.

FIG. 4 shows a side view of the magnetic tube 2 used for the measurements. The height of the tube was H=24 mm, the inner diameter DE=8 mm, and the outer diameter DA=14 mm. The upper half 6 of tube 2 shown in the drawing was through-magnetized from left to right as indicated by arrow 11, whereas the lower half 7 of magnetic tube 2 was through-magnetized in the opposite direction as indicated by arrow 12. This diametrically opposite through-magnetization of magnetic tube 2 afforded the arrangement of magnetic poles 3 and 4 shown in FIG. 2.

Figure 5:
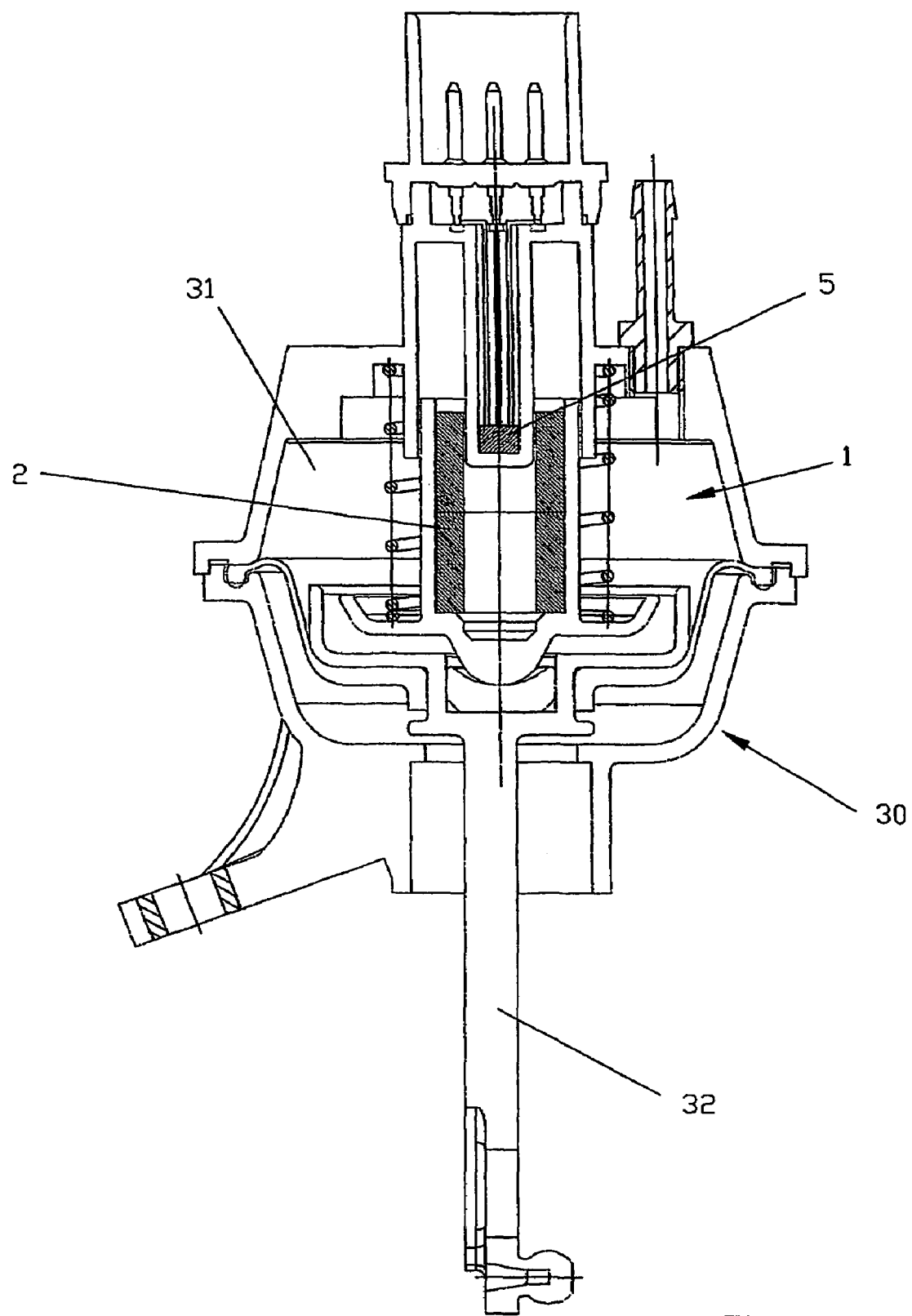
FIG. 5 shows the use of the measuring device in a pneumatic adjustment unit.

FIG. 5 shows a practical example of the application of the novel measuring device 1. Measuring device 1 is disposed centrally in a vacuum adjustment unit used in the motor vehicle field. The configuration of magnetic tube 2 is that of the magnetic tube represented in FIGS. 1 and 2. Hall sensor 5 is disposed centrally in the middle of magnetic tube 2. The entire measuring device 1 is disposed within a vacuum chamber 31 of an adjusting unit 30. By means of the measuring device 1, the position of a support 32 relative to its zero position can be measured and transmitted to the electronic system of the engine.

The invention claimed is:

1. A measuring device comprising:
   a Hall sensor for displacement measurements; and
   a magnetic tube,
   wherein the Hall sensor is disposed centrally and in an axially movable manner in said magnetic tube, a first half of said magnetic tube being cross-magnetized in a first direction such that said first half includes a first magnetic north pole diametrically opposed to a first magnetic south pole, and a second half of said magnetic tube being cross-magnetized in a second direction opposite said first direction such that said second half includes a second magnetic north pole diametrically opposed to a second magnetic south pole; and
   wherein the first magnetic north poles on said first half of said tube is diametrically opposed to said second magnetic north pole on said second half of said tube, and said first magnetic south pole on said first half of said tube is diametrically opposed to said second magnetic south pole on said second half of said tube.

2. The measuring device according to claim 1, wherein the Hall sensor is held in a support in an axially displaceable manner, said support preventing a rotational movement of the Hall sensor relative to the magnetic tube.

3. A method for assembling a measurement device, comprising:
   providing a tube formed of a magnetizable material;
   through-magnetizing a first half of said tube in a first direction such that said first half of said tube includes a first north pole diametrically opposed to a first south pole;
   through-magnetizing a second half of said tube in a second direction that is opposite said first direction such that said second half of said tube includes a second north pole diametrically opposed to a second south pole; and
   centrally disposing a Hall sensor in said tube such that said sensor is axially movable through said tube,
   wherein said first north pole is diametrically opposed to said second north pole, and said first south pole is diametrically opposed to said second south pole.

\* \* \* \* \*